United States Patent
Fentzke et al.

(10) Patent No.: US 10,733,229 B2
(45) Date of Patent: *Aug. 4, 2020

(54) IMAGE ANALYSIS OF MULTIBAND IMAGES OF GEOGRAPHIC REGIONS

(71) Applicant: OmniEarth, Inc., Arlington, VA (US)

(72) Inventors: Jonathan Fentzke, Arlington, VA (US); Shadrian Strong, Catonsville, MD (US); David Murr, Minneapolis, MN (US); Lars Dyrud, Crownsville, MD (US)

(73) Assignee: OmniEarth, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/377,843

(22) Filed: Apr. 8, 2019

(65) Prior Publication Data
US 2019/0236097 A1    Aug. 1, 2019

Related U.S. Application Data

(63) Continuation of application No. 15/440,084, filed on Feb. 23, 2017, now Pat. No. 10,255,296.
(Continued)

(51) Int. Cl.
*G06K 9/00* (2006.01)
*G06F 16/583* (2019.01)
(Continued)

(52) U.S. Cl.
CPC ......... *G06F 16/5838* (2019.01); *G06F 16/29* (2019.01); *G06F 16/51* (2019.01);
(Continued)

(58) Field of Classification Search
CPC .......... G06F 17/3025; G06F 17/30268; G06F 17/3028; G06F 9/00637; G06F 9/00651; G06F 9/00657; G06F 9/4562; G06F 9/628
See application file for complete search history.

(56) References Cited

U.S. PATENT DOCUMENTS

| 5,793,888 A | 8/1998 | Delanoy |
| 6,504,571 B1 | 1/2003 | Narayanaswami et al. |

(Continued)

FOREIGN PATENT DOCUMENTS

WO    WO 2016/054694    4/2016

OTHER PUBLICATIONS

PCT International Search Report and Written Opinion regarding PCT Patent App. No. PCT/US17/39567 dated Sep. 28, 2017.
(Continued)

*Primary Examiner* — Ping Y Hsieh
(74) *Attorney, Agent, or Firm* — Dunlap Codding, P.C.

(57) ABSTRACT

Computer-implemented methods and systems for image analysis of multiband images of geographic regions are described, including a method by one or more computer executing executable instructions stored in one or more non-transitory, tangible, computer readable media, the method comprising: receiving one or more multiband image of a geographic region, the one or more multiband image having pixels; generating a grey level co-occurrence matrix for the pixels in the one or more multiband image; generating a surface index for the one or more multiband image containing information indicative of a surface type represented by one or more of the pixels in the one or more multiband image; and classifying the pixels of the one or more multiband image into one of a group of predefined land cover classes, based on the surface index in combination with the grey level co-occurrence matrix.

18 Claims, 9 Drawing Sheets
(2 of 9 Drawing Sheet(s) Filed in Color)

Related U.S. Application Data

(60) Provisional application No. 62/299,717, filed on Feb. 25, 2016.

(51) Int. Cl.
  G06K 9/46 (2006.01)
  G06K 9/62 (2006.01)
  G06F 16/51 (2019.01)
  G06F 16/58 (2019.01)
  G06F 16/29 (2019.01)

(52) U.S. Cl.
  CPC ..... *G06F 16/5866* (2019.01); *G06K 9/00637* (2013.01); *G06K 9/00651* (2013.01); *G06K 9/00657* (2013.01); *G06K 9/4652* (2013.01); *G06K 9/628* (2013.01)

(56) References Cited

U.S. PATENT DOCUMENTS

| | | | |
|---|---|---|---|
| 7,424,133 | B2 | 9/2008 | Schultz et al. |
| 8,095,434 | B1 | 1/2012 | Puttick et al. |
| 9,082,162 | B2 | 7/2015 | Gokturk et al. |
| 9,418,290 | B2 | 8/2016 | Lavigne et al. |
| 9,424,305 | B1 | 8/2016 | Puttick |
| 9,536,148 | B2 | 1/2017 | Gross |
| 9,552,638 | B2 | 1/2017 | Lavigne et al. |
| 10,255,296 | B2 * | 4/2019 | Fentzke ............ G06F 16/5838 |
| 2012/0323798 | A1 | 12/2012 | Den Herder et al. |
| 2013/0046746 | A1 | 2/2013 | Bennett |
| 2014/0294239 | A1 * | 10/2014 | Duckett ............... G06K 9/6228 382/103 |
| 2015/0016668 | A1 * | 1/2015 | Cheriyadat ........ G06K 9/00637 382/103 |
| 2015/0036874 | A1 * | 2/2015 | Gueguen ........... G06K 9/00637 382/103 |
| 2015/0213315 | A1 | 7/2015 | Gross |
| 2015/0347872 | A1 | 12/2015 | Taylor et al. |
| 2016/0005097 | A1 | 1/2016 | Hsiao et al. |
| 2016/0027051 | A1 | 1/2016 | Gross |
| 2016/0063724 | A1 * | 3/2016 | Tunstall ................ G06T 7/0014 382/128 |
| 2016/0093056 | A1 * | 3/2016 | Ouzounis ........... G06K 9/00651 382/224 |
| 2016/0196747 | A1 | 7/2016 | Tsyrklevich et al. |
| 2016/0379388 | A1 * | 12/2016 | Rasco .................... G06F 16/29 715/753 |
| 2017/0308549 | A1 | 10/2017 | Sims et al. |

OTHER PUBLICATIONS

"OmniParcels for Insurance", PowerPoint Presentation, OmniEarth, Inc., Mar. 25, 2016.

"OmniParcels National Building Footprint Database", OmniEarth, Inc., 2017.

"OmniParcels/Yardographics/Water Resources", OmniEarth, Inc., retrieved from the internet: https://parceldemo.omniearth.net/#/map/, Feb. 2016.

"OmniParcels Delivers Current, Searchable Property Attributes with Regular Updates", via Internet Archive Wayback Machine [retrieved from the internet Jul. 25, 2017] retrieved from: https://web.archive.org/web/20160305114343/http://omniparcels.omniearth.net/, Mar. 5, 2016.

Goldberg et al., "Extracting geographic features from the Internet to automatically build detailed regional gazetteers," International Journal of Geographical Information Science, 23:1, 93-128, Jan. 2009.

Harris Geospatial Solutions, "Using ENVI and Geographic Information Systems (GIS)", Jan. 31, 2013.

Commonwealth of Massachusetts Executive Office of Environmental Affairs, "Parcel Mapping Using GIS a Guide to Digital Parcel Map Development for Massachusetts Local Governments", Aug. 1999.

European Court of Auditors, "The Land Parcel Identification System: a useful tool to determine the eligibility of agricultural land—but its management could be further improved", Luxembourg, 2016.

Nielsen, Michael A., "Neural Networks and Deep Learning", Determination Press, 2015, updated Jan. 19, 2017.

Esri, Getting Started with ArcGIS 2005, available at: <http://downloads.esri.com/support/documentation/ao_/1003Getting_Started_with_ArcGIS.pdf >, downloaded on Sep. 1, 2019 (Year: 2005).

Holt, Alec, "Spatial similarity and GIS: the grouping of spatial kinds," 1999, available at: < https://pdfs.semanticscholar.org/1ff7/49c905db58bb884a9d6609de9452edf7921 b.pdf >, downloaded on Sep. 1, 2019 (Year: 1999).

Artificial Neural Networks Technology, [online], archived on Nov. 23, 2015, available at: <https://web.archlve.org/web/20151123211404/http://www2.psych.utoronto.ca/users/relngold/course> (Year: 2015).

Marr, Bernard, "A Short History of Machine Learning—Every Manager Should Read," [online], Feb. 19, 2016, available at: < https://www.forbes.com/sltes/bernardmarr/2016/02/19/a-short-history-of-machine-learning-every-manager-should-read/#70f07e5415e7 > (Year: 2016).

\* cited by examiner

US 10,733,229 B2

IMAGE ANALYSIS OF MULTIBAND IMAGES OF GEOGRAPHIC REGIONS

CROSS-REFERENCE TO RELATED APPLICATIONS

The present application claims priority to, and is a continuation of, U.S. patent application Ser. No. 15/440,084, filed Feb. 23, 2017, entitled "System and Method for Managing GeoDemographic Data", which claims priority to U.S. Provisional Application No. 62/299,717, filed Feb. 25, 2016, the entire disclosures of each of which are hereby incorporated herein by reference.

BACKGROUND

The present invention generally deals with systems and method of managing a combination of geographic data and demographic data, or geodemographic data.

The world is becoming more data driven. The data in various public and private databases is only as valuable as the information that may be gleaned from them. Many companies provide data products by mining specific databases for predetermined purposes. Such data mining is used to create data packages for sale or use.

Further, others have created markets by fusing data provided by multiple data providers. However, such products derived by such fused data sources are costly, as prices multiply with the number of data sources.

There exists a need to provide an improved method and apparatus of managing fused data.

SUMMARY

The present invention provides an improved method and apparatus for creating a fused geodemographic data product.

Various embodiments described herein are drawn to a device that includes an image data receiving component operable to receive multiband image data of a geographic region; a surface index generation component operable to generate a surface index based on at least a portion of the received multiband image data; a classification component operable to generate a surface cover classification based on the surface index; a segment data receiving component operable to receive segment data relating to at least a portion of the geographic region; a zonal statistics component operable to generate a segment surface cover classification based on the surface cover classification and the segment data; a feature data receiving component operable to receive feature data; a feature index generation component operable to generate a feature index based on the received feature data; and a catalog component operable to generate a segment feature index based on the feature index and the segment surface cover classification.

BRIEF SUMMARY OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and form a part of the specification, illustrate an exemplary embodiment of the present invention and, together with the description, serve to explain the principles of the invention. In the drawings.

DETAILED DESCRIPTION

Figure 1:
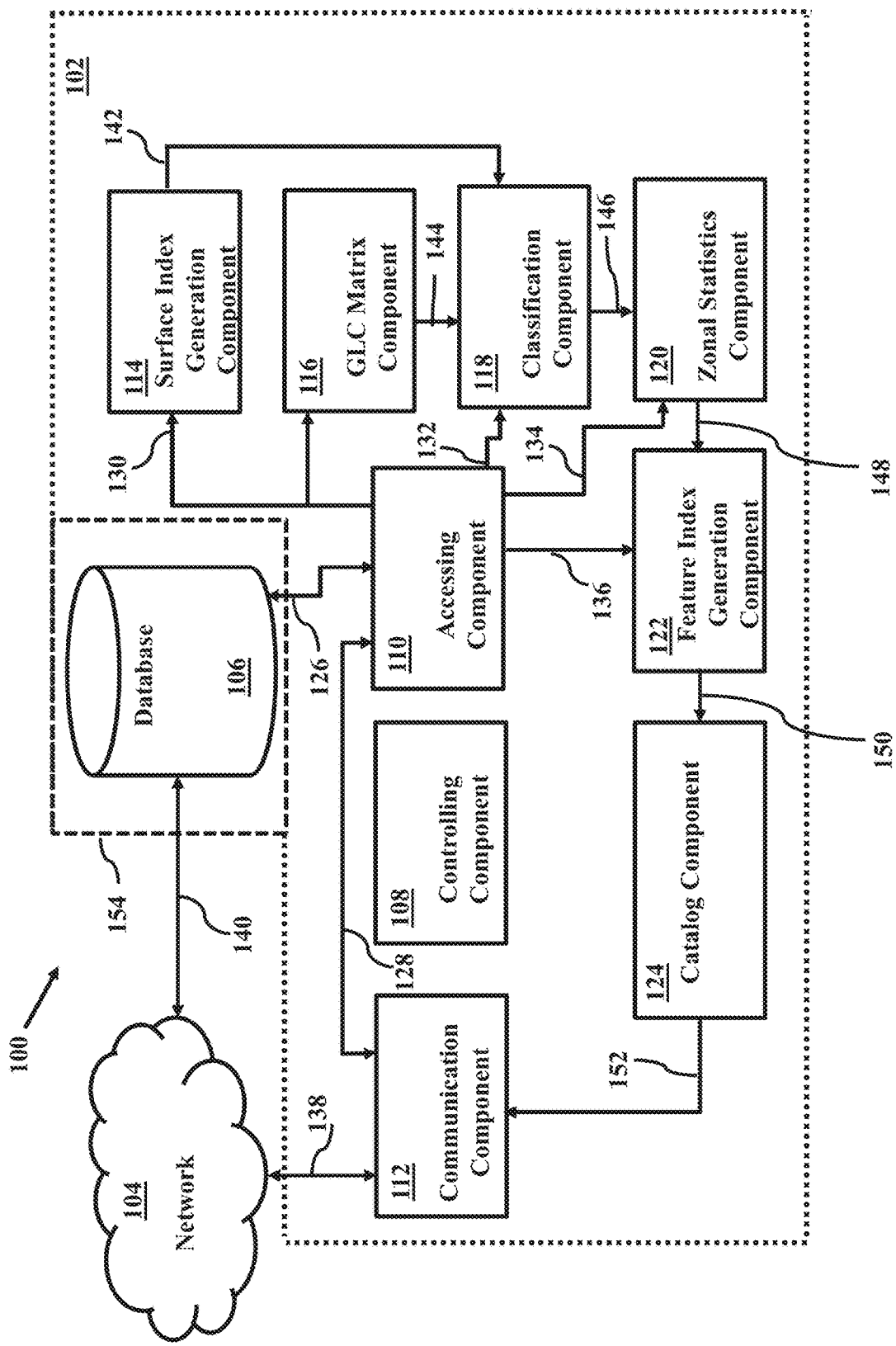
FIG. 1 illustrates an example system for managing geodemographic data in accordance with aspects of the present invention.

Aspects of the present invention are drawn to a system and method for managing geodemographic data.

A first aspect of the present invention is drawn to using a grey level co-occurrence matrix (GLCM) to additionally help identify pixels in an image. A classification component in accordance with aspects of the present invention is able to classify each pixel of an image in view of the vegetation index in combination with results from the GLCM. The additional information provided by the GLCM reduces the likelihood that a pixel will be incorrectly classified.

Another aspect of the present invention is drawn to using a plurality of classification components to classify each pixel and then determining the final surface cover classification based on a majority vote of the plurality of classifications for each pixel. Is should be noted that, in some embodiments, this is on a class by class basis, not on the whole image. In some embodiments, the image is broken up into different class images and is then reassembled.

As mentioned above, there are many classification methods, each with respective strengths and weaknesses. In accordance with aspects of the present invention, a pixel of an image may be classified by at least three classification components. If one of the three resulting classifications is different from the other two, it is ignored. In other words the majority of the two similar classifications of the pixel will increase the likelihood that the pixel will be classified correctly.

Another aspect of the present invention is drawn to determining features within an area of land within a satellite image and providing an index of the features per segment of land, or a segment feature index, of the area of land within satellite image. The segment feature index may include a primary feature index, a secondary feature index and a tertiary feature index.

The primary feature index relates to raw tallies of features from feature data per land segment, which will illustrate measured features per land segment. For example, a raw tally of features may be that, of the 127 parcels of land within the area of the satellite image, there are 120 houses and 20 in-ground pools.

The secondary feature index relates predetermined Boolean relationships of features from the feature data per land segment, which will illustrate predetermined associations of measured features per land segment. For example, a predetermined Boolean relationship of features from the feature data per land segment may be that of the 127 parcels of land within the area of the satellite image, 7 have houses AND an in-ground pool.

The tertiary feature index relates to predetermined likelihoods of Boolean relationships of features from the feature data per land segment, which will infer associations of measured features per land segment. For example, many Boolean relationships may be determined, but only a single one provides a likelihood that surpasses a predetermined likelihood threshold. For example, for purposes of discussion, suppose the predetermined likelihood threshold is 60%, meaning that any Boolean relationship having a likelihood below 60% would be ignored. Further, for this discussion, presume that a single Boolean relationship of features from the feature data per land segment is greater than 60%, and indicates that that there is a 65% likelihood that one of the 7 have houses having an in-ground pool will purchase a car costing at least $45,000.

Aspects of the present invention will now be described with reference to FIGS. 1-9.

FIG. 1 illustrates a system 100 for managing geodemographic data in accordance with aspects of the present invention.

As shown in the figure, system 100 includes a data managing component 102 and a network 104. Data managing component 102 includes a database 106, a controlling component 108, an accessing component 110, a communication component 112, a surface index generation (SIG) component 114, a gray level co-occurrence (GLC) matrix generation component 116, a classification component 118, a zonal statistics component 120, a feature index generation (FIG) component 122 and a catalog component 124.

In this example, database 106, controlling component 108, accessing component 110, communication component 112, SIG component 114, GLC matrix generation component 116, classification component 118, zonal statistics component 120, FIG component 122 and catalog component 124 are illustrated as individual devices. However, in some embodiments, at least two of database 106, controlling component 108, accessing component 110, communication component 112, SIG component 114, GLC matrix generation component 116, classification component 118, zonal statistics component 120, FIG component 122 and catalog component 124 may be combined as a unitary device. Further, in some embodiments, at least one of database 106, controlling component 108, accessing component 110, communication component 112, SIG component 114, GLC matrix generation component 116, classification component 118, zonal statistics component 120, FIG component 122 and catalog component 124 may be implemented as a computer having tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Controlling component 108 is in communication with each of accessing component 110, communication component 112, SIG component 114, GLC matrix generation component 116, classification component 118, zonal statistics component 120, FIG component 122 and catalog component 124 by communication channels (not shown). Controlling component 108 may be any device or system that is able to control operation of each of accessing component 110, communication component 112, SIG component 114, GLC matrix generation component 116, classification component 118, zonal statistics component 120, FIG component 122 and catalog component 124.

Accessing component 110 is arranged to bi-directionally communicate with database 106 via a communication channel 126 and is arranged to bi-directionally communicate with communication component 112 via a communication channel 128. Accessing component 110 is additionally arranged to communicate with SIG component 114 and GLC matrix generation component 116 via a communication channel 130, to communicate with classification component 118 via a communication channel 132, to communicate with zonal statistics component 120 via a communication channel 134 and to communicate with FIG component 122 via a communication channel 136. Accessing component 110 may be any device or system that is able to access data within database 106 directly via communication channel 126 or indirectly, via communication channel 128, communication component 112, a communication channel 138, network 104 and communication channel 140.

Communication component 112 is additionally arranged to bi-directionally communicate with network 104 via communication channel 138. Communication component 112 may be any device or system that is able to bi-directionally communicate with network 104 via communication channel 138.

Network 104 is additionally arranged to bi-directionally communicate with database 106 via communication channel 140. Network 104 may be any of known various communication networks, non-limiting examples of which include a Local Area Network (LAN), a Wide Area Network (WAN), a wireless network and combinations thereof. Such networks may support telephony services for a mobile terminal to communicate over a telephony network (e.g., Public Switched Telephone Network (PSTN). Non-limiting example wireless networks include a radio network that supports a number of wireless terminals, which may be fixed or mobile, using various radio access technologies. According to some example embodiments, radio technologies that can be contemplated include: first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), 4G, etc. For instance, various mobile communication standards have been introduced, such as first generation (1G) technologies (e.g., advanced mobile phone system (AMPS), cellular digital packet data (CDPD), etc.), second generation (2G) technologies (e.g., global system for mobile communications (GSM), interim standard 95 (IS-95), etc.), third generation (3G) technologies (e.g., code division multiple access 2000 (CDMA2000), general packet radio service (GPRS), universal mobile telecommunications system (UMTS), etc.), and beyond 3G technologies (e.g., third generation partnership project (3GPP) long term evolution (3GPP LTE), 3GPP2 universal mobile broadband (3GPP2 UMB), etc.).

Complementing the evolution in mobile communication standards adoption, other radio access technologies have also been developed by various professional bodies, such as the Institute of Electrical and Electronic Engineers (IEEE), for the support of various applications, services, and deployment scenarios. For example, the IEEE 802.11 standard, also known as wireless fidelity (WiFi), has been introduced for wireless local area networking, while the IEEE 802.16 standard, also known as worldwide interoperability for microwave access (WiMAX) has been introduced for the provision of wireless communications on point-to-point links, as well as for full mobile access over longer distances. Other examples include Bluetooth™, ultra-wideband (UWB), the IEEE 802.22 standard, etc.

SIG component 114 is additionally arranged to communicate with classification component 118 via a communication channel 142. SIG component 114 may be any device or system that is able to generate a surface index, or a normalized difference surface index, a non-limiting example of which includes a normalized difference vegetation index (NDVI). An NDVI is a simple graphical indicator that can be used to analyze remote sensing measurements, typically not necessarily form a space platform, and assess whether the target being observed contains live green vegetation or not. In an example embodiment, a normalized difference vegetation index is generated using the following equation:

$$(v_{N/R} - v_R)/(v_{N/R} + v_R) \qquad (1)$$

where $v_{N/R}$ is the near infrared band and where $v_R$ is the red band.

GLC matrix generation component 116 is additionally arranged to communicate with classification component 118 via a communication channel 144. GLC matrix generation component 116 may be any device or system that is able to generate a GLC matrix image band. GLC matrix generation component 116 provides a series of "second order" texture calculations, and considers the relationship between groups of two pixels in the original image to generate a GLC matrix image band. GLC matrix generation component 116 considers the relation between two pixels at a time, called the reference and the neighbor pixel. Each pixel is the reference pixel at some point in the calculation. The result of this process is a plurality of measures for each pixel that indicates a type of relationship between that pixel and its neighbors, and most measures are weighted averages of the normalized GLC matrix cell contents.

In an example embodiment, GLC matrix generation component 116 provides 17 measures for each pixel. These measures are split into three categories: contrast, orderliness and statistics. The contrast group includes a contrast band, a dissimilarity band, a homogeneity band and an inertia band. The orderliness group includes an angular second moment (ASM) with energy band—also called "uniformity band," a maximum probability (MAX) band, an entropy (ENT) band, a sum of entropy (SENT) band and a difference of entropy (DENT) band. The statistics group includes an average (MEAN) band, a variance (VAR) band—also known as the "sum of squares variance" band, a correlation (CORR) band, a maximum correlation coefficient (MaxCORR) band, an information measures of correlation 1 (imcorr1) band, an information measures of correlation 2 (imcorr2) band, a sum of average (SAVG) band, an sum of variance (SVAR) band and a difference of variance (DVAR) band. In an example embodiment, out of the 18 bands, three are used, one for each category.

Classification component 118 is additionally arranged to communicate with zonal statistics component 120 via a communication channel 146. Classification component 118 may be any device or system that is able to classify each pixel, or group of pixels, of an image as one of the group of predefined land cover classes. In some non-limiting examples, classification component 118 is able to classify each pixel as one of the group consisting of consisting of grass, a tree, a shrub, a paved surface, a man-made pool, a natural water body and artificial turf.

Zonal statistics component 120 is additionally arranged to communicate with FIG component 122 via a communication channel 148. Zonal statistics component 120 may be any device or system that is able to generate a land cover classification per segment of land. For example, zonal statistics component 120 may determine that a specific county, as the segment of land, has 38% tree cover, 18% shrub cover, 16% blacktop cover, 12% grass cover, 8% natural water cover and 8% man-made structure cover based on the classification of the pixels of the image within the county as defined by the segment data. In some embodiments, zonal statistics component 11 may determine the percentages of cover by dividing the number of pixels of the image within the segment by the number of pixels of a particular type of classification (cover).

FIG component 122 is additionally arranged to communicate with catalog component 124 via a communication channel 150. FIG component 122 may be any device or system that is able to generate a feature index of the area of land. For example, FIG component 122 may generate a feature index indicating the number of houses, the number of plots of land with over 1 acre AND an in-ground swimming pool, and a likely number of houses that will purchase a riding lawn mower based on plot size and annual income.

Catalog component 124 is additionally arranged to communicate with communication component 112 via a communication channel 152. Catalog component 124 may be any device or system that is able to generate a feature index per segment of land.

Communication channels 126, 128, 130, 132, 134, 136, 138, 140, 142, 144, 146, 148, 150 and 152 may be any known wired or wireless communication channel.

Operation of system 100 will now be described with reference to FIGS. 2-9.

Figure 2:
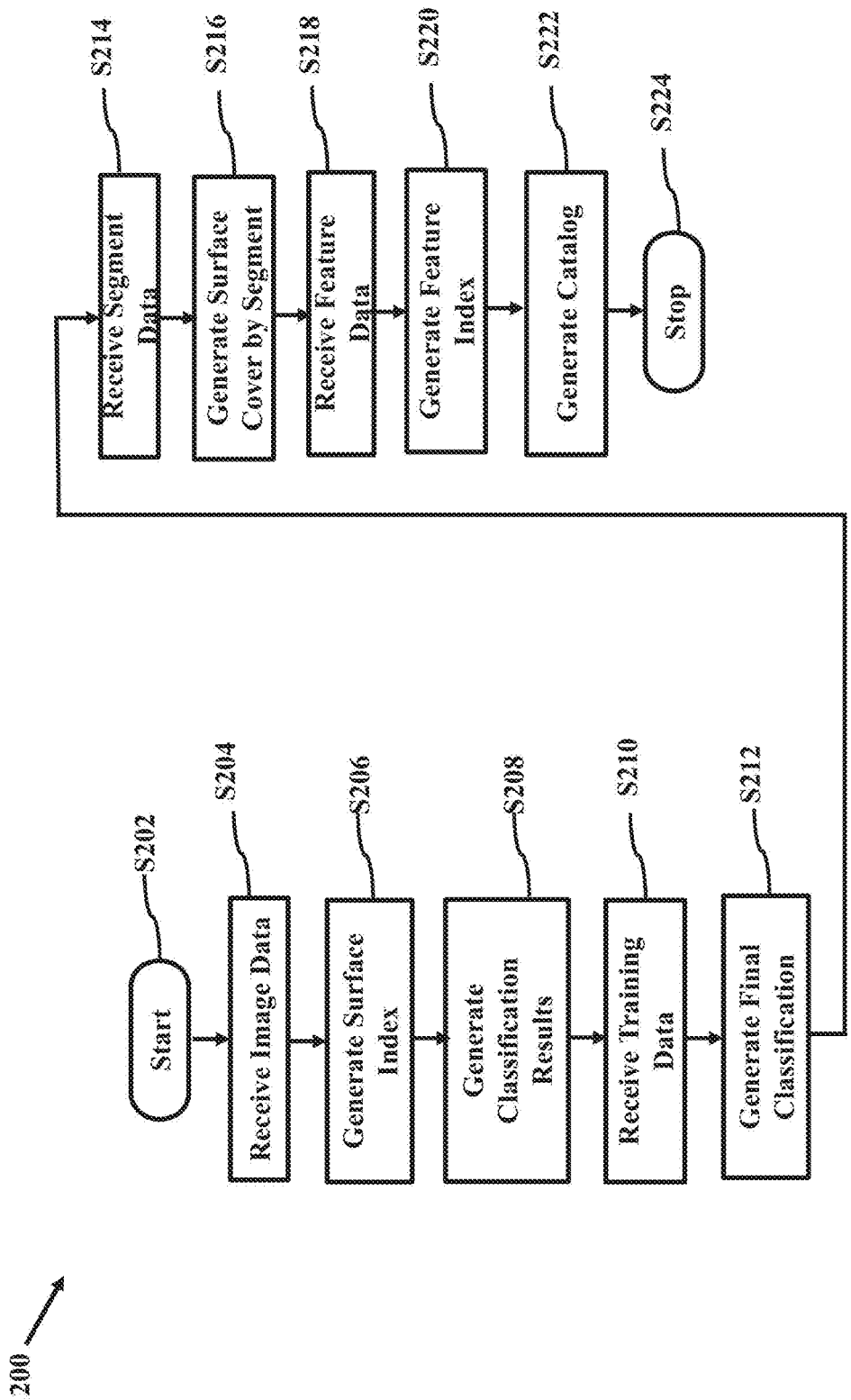
FIG. 2 illustrates an example method of managing geodemographic data in accordance with aspects of the present invention.

FIG. 2 illustrates a method 200 of managing geodemographic data.

As shown in the figure, method 200 starts (S202) and image data is received (S204). For example, as shown in FIG. 1, accessing component 110 retrieves image data from database 106. In some embodiments, accessing component 110 may retrieve the image data directly from database 106 via communication channel 126. In other embodiments, accessing component 110 may retrieve the image data from database 106 via a path of communication channel 128, communication component 112, communication channel 138, network 104 and communication channel 140.

Database 106 may have various types of data stored therein. This will be further described with reference to FIG. 3.

Figure 3:
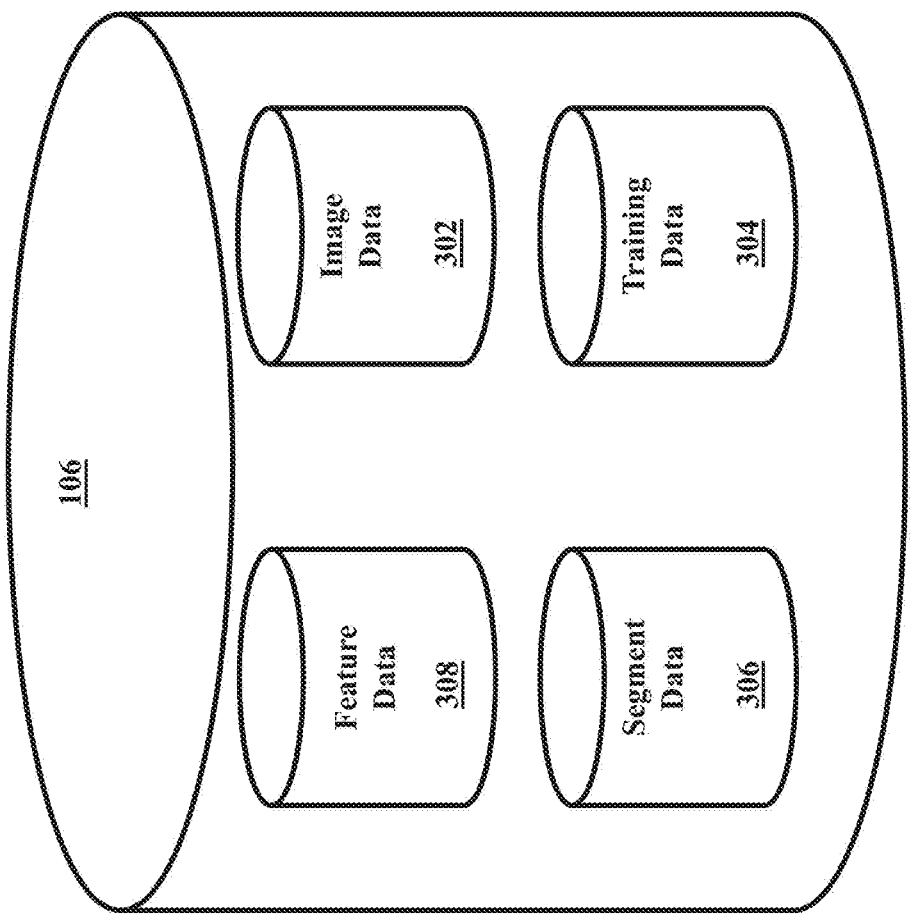
FIG. 3 illustrates an example of the database of FIG. 1.

FIG. 3 illustrates an example of database 106 of FIG. 1.

As shown in FIG. 3, database 106 includes an image data database 302, a training data database 304, a segment data database 306 and a feature data database 308. In this example, image data database 302, training data database 304, segment data database 306 and feature data database 308 are illustrated as individual devices. However, in some embodiments, at least two of image data database 302, training data database 304, segment data database 306 and feature data database 308 may be combined as a unitary device. Further, in some embodiments, at least one of image data database 302, training data database 304, segment data database 306 and feature data database 308 may be implemented as a computer having tangible computer-readable media for carrying or having computer-executable instructions or data structures stored thereon.

Image data database 302 includes image data corresponding to an area of land for which water is to be managed. The image data may be provided via a satellite imaging platform. The image data may include a single band or multi-band image data, wherein the image (of the same area of land for which water is to be managed) is imaged in a more than one frequency. In some embodiments, image data may include 4-band image data, which include red, green, blue and near infrared bands (RGB-NIR) of the same area of land for which water is to be managed. In other embodiments, the image data may include more than 4 bands, e.g., hyperspectral image data. The image data comprises pixels, each of which includes respective data values for frequency (color) and intensity (brightness). The frequency may include a plurality of frequencies, based on the number of bands used in the image data. Further, there may be a respective intensity value for each frequency value.

Training data database 304 includes training data to train a classification component to distinctly classify an image pixel. For example, training data for a 4-band image may include specific 4-band pixels data values associated with each land cover classification. In other words, there may be training data for a pixel associated with an image of a tree and different training data for a pixel associated with a man-made surface such as blacktop.

Segment data database 306 includes geographically divided portions of the land. This may be provided by government agencies or public utilities. Non-limiting examples of geographically divided portions include country, state, county, township, city or individual land owner borders.

Feature data database 308 includes feature data associated with the geographic area that may be provided by any known source, non-limiting examples of which include weather data, demographic data, social data, census data, tax data and open source data.

Returning to FIG. 1, in some cases, database 106 is included in data managing component 102. However, in other cases, database 106 is separated from data managing component 102, as indicated by dotted rectangle 154.

As accessing component 110 will be accessing many types of data from database 106, accessing component 110 includes many data managing components. This will be described with greater detail with reference to FIG. 4.

Figure 4:
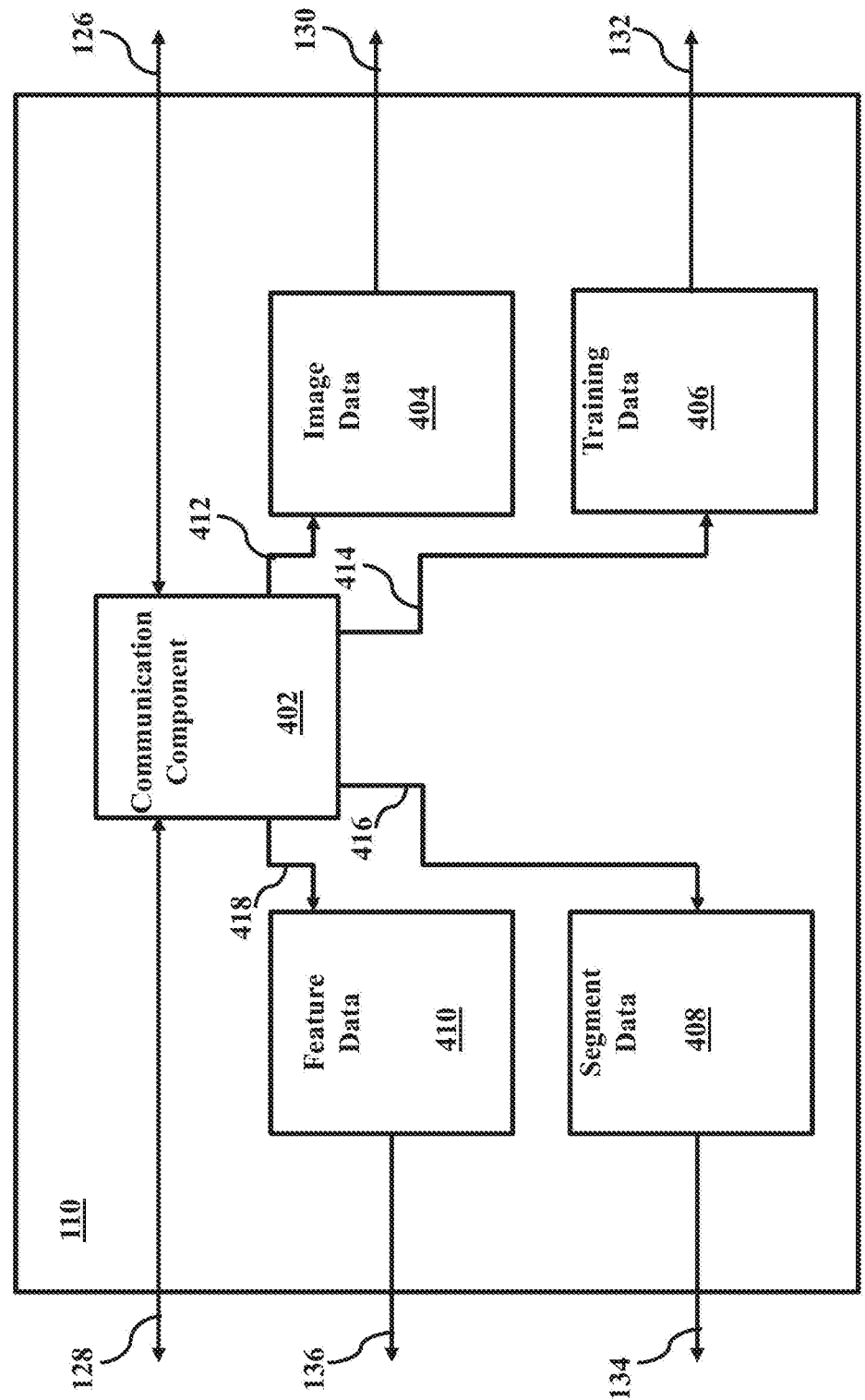
FIG. 4 illustrates an example of the accessing component of FIG. 1.

FIG. 4 illustrates an example of accessing component 110 of FIG. 1.

As shown in FIG. 4, accessing component 110 includes a communication component 402, an image data receiving component 404, a training data receiving component 406, a segment data receiving component 408 and a feature data receiving component 410.

In this example, communication component 402, image data receiving component 404, training data receiving component 406, segment data receiving component 408 and feature data receiving component 410 are illustrated as individual devices. However, in some embodiments, at least two of communication component 402, image data receiving component 404, training data receiving component 406, segment data receiving component 408 and feature data receiving component 410 may be combined as a unitary device. Further, in some embodiments, at least one of communication component 402, image data receiving component 404, training data receiving component 406, segment data receiving component 408 and feature data receiving component 410 may be implemented as a computer having tangible computer-readable media for carrying or having computer-executable instructions or data structures stored thereon.

Communication component 402 is arranged to bi-directionally communicate with database 106 via a communication channel 126 and is arranged to bi-directionally communicate with communication component 112 via a communication channel 128. Communication component 402 is additionally arranged to directionally communicate with image data receiving component 404 via a communication channel 412, to communicate with training data receiving component 406 via a communication channel 414 and to communicate with segment data receiving component 408 via a communication channel 416, to communicate with feature data receiving component 410 via a communication channel 418. Communication component 402 may be any device or system that is able to access data within database 106 directly via communication channel 126 or indirectly, via communication channel 128, communication component 112, communication channel 138, network 104 and communication channel 140. Image data receiving component 404, training data receiving component 406, segment data receiving component 408 and feature data receiving component 410 may each be any device or system that is able to receive data from communication component 402 and to output the received data.

Image data component 402 is additionally arranged to communicate with SIG component 114 and with GLC matrix component 116 via communication channel 130. Training data component 406 is additionally arranged to communicate with classification component 118 via communication channel 132. Segment data receiving component 408 is additionally arranged to communicate with zonal statistics component 120 via communication channel 134. Feature data receiving component 410 is additionally arranged to communicate with FIG component 122 via communication channel 136. Communication channels 412, 414, 416 and 418 may be any known wired or wireless communication channel.

Returning to FIG. 1, at this point accessing component 110 has received the image data. An example of such image data will now be described with reference to FIG. 5.

Figure 5:
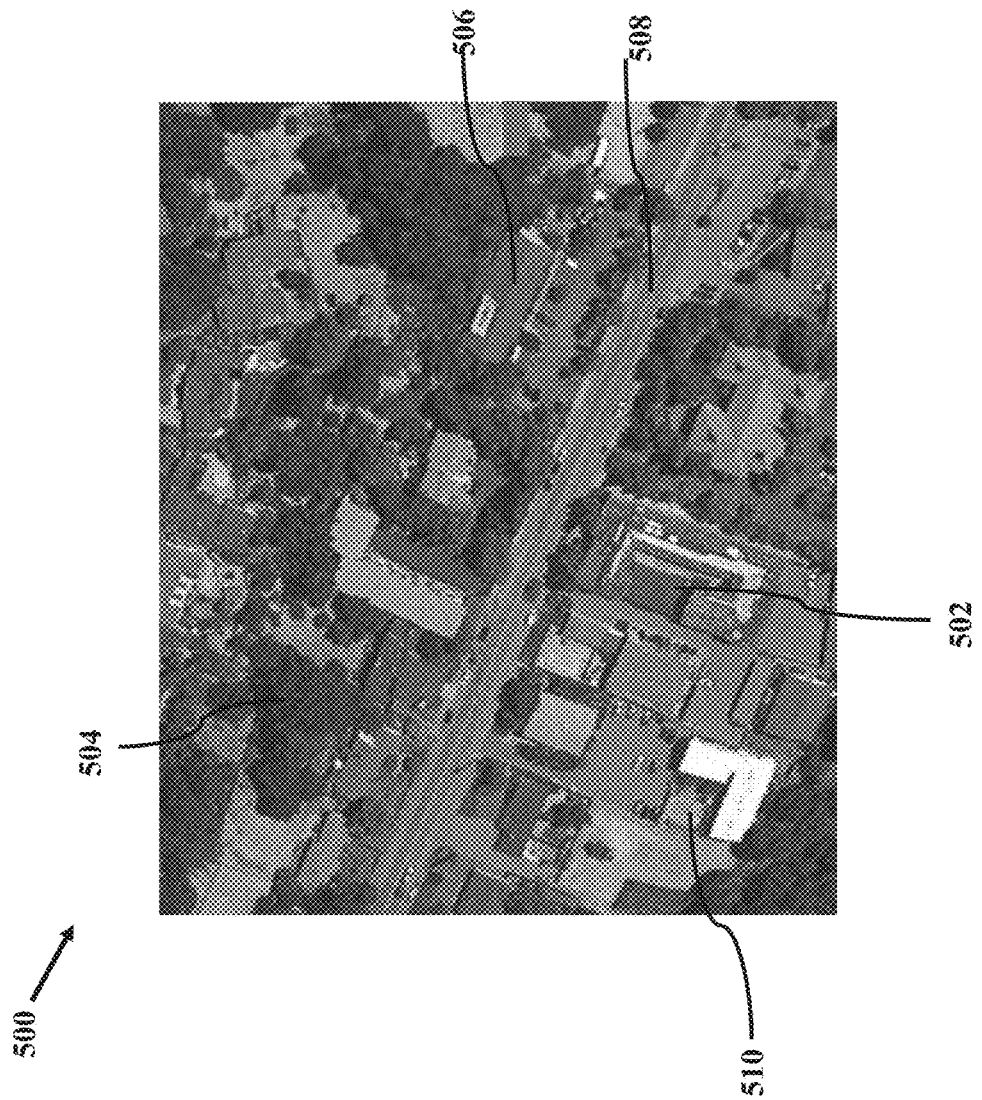
FIG. 5 illustrates a satellite image of a plot of land.

FIG. 5 illustrates a satellite image 500 of a plot of land.

As shown in the figure, satellite image 500 includes: grassy areas, a sample of which is labeled as grassy area 502; a plurality of trees, a sample of which is labeled as trees 504; and a plurality of man-made surfaces. The man-made surfaces include: a plurality of buildings, a sample of which is indicated as building 506; a plurality of paved surfaces, a sample of which is indicated as road 508; and a plurality of pools, a sample of which is indicated as pool 510.

As for a broad view of method 200, system 100 will be able to determine the surface covering of land within satellite image 500, to determine distinct segments of the area of land within satellite image 500, to determine features within the area of land within satellite image 500 and to provide an index of the features per segment of land, or a segment feature index, of the area of land within satellite image 500. The segment feature index may include: a primary feature index that relates to raw tallies of features from the feature data per land segment, which will illustrate measured features per land segment; a secondary feature index that relates to predetermined Boolean relationships of features from the feature data per land segment, which will illustrate predetermined associations of measured features per land segment; and a tertiary feature index that relates to predetermined likelihoods of Boolean relationships of features from the feature data per land segment, which will infer associations of measured features per land segment.

After the image data is received (S204), a surface index is generated (S206). For example, as shown in FIG. 1, accessing component 110 provides the received image data to SIG component 114 via communication channel 130. As shown in FIG. 1 accessing component 110 retrieves image data from database 106. As shown in FIG. 3, database 106 provides the image data from image data database 302. As shown in FIG. 4, communication component 402 receives the image data from image data database 302 and provides the image data to image data receiving component 404 via communication channel 414. Returning to FIG. 1, image data receiving component 404 (of accessing component 110) then provides the image data to SIG component 114 via communication channel 130.

In an example embodiment, SIG component 114 generates surface index for the image data by any known manner. A non-limiting example of a surface index includes any known vegetation index. SIG component 114 then provides the surface index to classification component 118 via communication channel 142. For purposes of discussion herein, let the surface index be a vegetation index.

Returning to FIG. 2, after the surface index is generated (S206), classification results are generated (S208). For example, as shown in FIG. 1, accessing component 110 provides the received image data additionally to classification component 118 via communication channel 132. Further, SIG component 114 provides the surface index to classification component 118 via communication line 142. With the image data from accessing component 110 and with the surface index from SIG component, classification component 118 classifies each pixel of data as one of many predetermined classes.

For example, returning to FIG. 5, a pixel within image 500 at the location of trees 504 will have colors (frequencies) and intensities indicative of trees. As such, classification component will use information from the surface index in addition to the image data for that pixel to classify the pixel as a tree. Similarly, a pixel within image 500 at the location of road 508 will have colors (frequencies) and intensities indicative of a road. As such, classification component will use information from the surface index in addition to the image data for that pixel to classify the pixel as a road. This classification continues for each pixel within image 500.

Returning to FIG. 2, after the classification results are generated (S208), training data is received (S210). For example, as shown in FIG. 1 accessing component 110 retrieves training data from database 106. As shown in FIG. 3, database 106 provides the training data from training data database 304. As shown in FIG. 4, communication component 402 receives the training data from training data database 304 and provides the training data to training data receiving component 406 via communication channel 414. Returning to FIG. 1, training data receiving component 406 (of accessing component 110) then provides the training data to classification component 118 via communication channel 132.

It should be noted that in the example discussed above, generating the classification results (S208) is prior to receiving training data (S210). However, in some embodiments, generating the classification results (S208) may occur after receiving training data (S210). Further, in some embodiments, generating the classification results (S208) may occur concurrently with receiving training data (S210).

Returning to FIG. 2, after the training data is received (S210), a final classification is generated (S212). For example, in one embodiment, every pixel within the entire image 500 of FIG. 5 will have been classified by any known classification system or method. In another example embodiment, groups of similar pixels are classified using GLC matrix component 116. GLC matrix generation component 116 generates a GLC matrix and provides this matrix to classification component 118 via communication channel 144.

In one embodiment, classification component 118 classifies the pixels using any known classification system or method, non-limiting examples of which include a CART classification, a Naïve Bayes classification, a random forests classification, a GMO Max Entropy classification, an MCP classification, a Pegasos classification, an IKPamir classification, a voting SVM classification, a margin SVM classification and a Winnow classification.

CART (for Classification and Regression Trees) classification uses a decision tree as a predictive model which maps observations about an item to conclusions about the item's target value.

Naïve Bayes classification may be any device or system that is able to use a simple probabilistic classifier based on applying Bayes' theorem with strong (naïve) independence assumptions between the features. Naive Bayes classification combines a Bayes classification model with a decision rule. Other example embodiments may use a Fast Naïve Bayes classification, which works on binary or integer weighted features.

Random forests classification may be any device or system that is able to employ an ensemble learning method for classification, regression and other tasks, and operates by constructing a multitude of decision trees at training time and outputting the class that is the mode of the classes (classification) or mean prediction (regression) of the individual trees.

GMO Max Entropy classification may be any device or system that is able to use a multinomial logistic regression classification method that generalizes logistic regression to multiclass problems, i.e. with more than two possible discrete outcomes. In other words, GMO Max Entropy classification uses a model that predicts the probabilities of the different possible outcomes of a categorically distributed dependent variable, given a set of independent variables (which may be real-valued, binary-valued, categorical-valued, etc.).

MCP (for Multi Class Perceptron) classification may be any device or system that is a type of linear classifier and as such makes its predictions based on a linear predictor function combining a set of weights with the feature vector. MCP classification is used for supervised classification.

Pegasos (for Primal Estimated sub-GrAdient SOlver for SVM) classification may be any device or system that is able to employ simple and effective iterative algorithm for solving the optimization problem cast by Support Vector Machines (SVM). The method alternates between stochastic gradient descent steps and projection steps. The method was created by Shalev-Shwartz, Singer, and Srebro.

IKPamir (for Intersection Kernel Support Vector Machines) classification may be any device or system that is able to employ a non-linear SVM classifier and uses histogram intersection kernels.

Voting SVM classification may be any device or system that is able to employ, for the one-versus-one approach, classification by a max-wins voting strategy. Specifically, every classifier assigns the instance to one of the two classes, then the vote for the assigned class is increased by one vote, and finally the class with the most votes determines the instance classification.

Margin SVM classification may be any device or system that is able to construct a hyperplane or set of hyperplanes in a high- or infinite-dimensional space, which can be used for classification, regression, or other tasks. Intuitively, a good separation is achieved by the hyperplane that has the largest distance to the nearest training data point of any class (so-called functional margin), since in general the larger the margin the lower the generalization error of the classifier. Margin SVM classification employs a linear SVM model.

Winnow classification may be any device or system that is able to use an algorithm similar to the perceptron algorithm. However, MCP classification uses an additive weight-update scheme, whereas Winnow classification uses a multiplicative scheme that allows it to perform much better when many dimensions are irrelevant (hence its name).

In another embodiment, a classification component classifies the pixels using a voting system that takes into account a plurality of known classification system or method. This embodiment will be further described with reference to FIG. 6.

Figure 6:
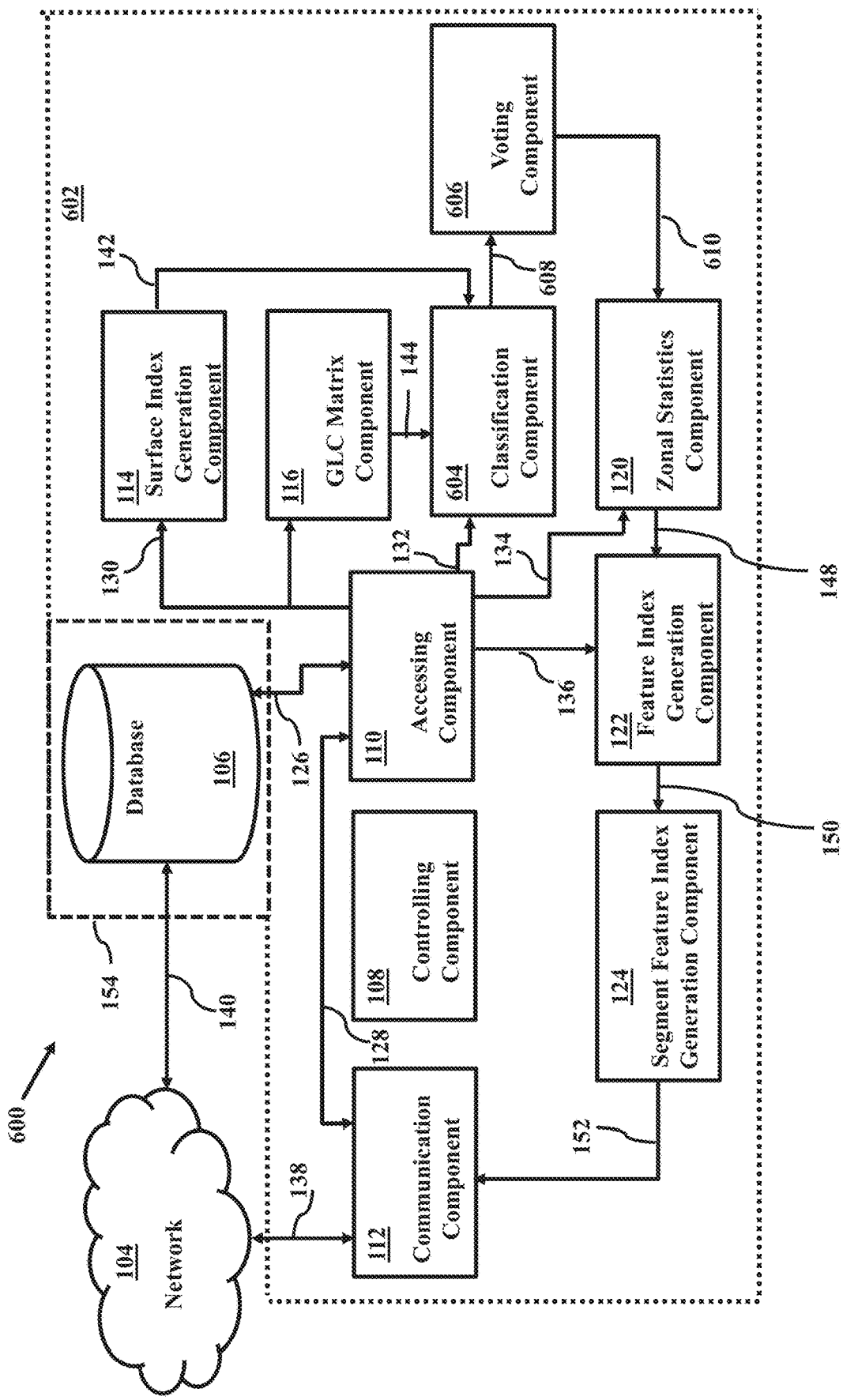
FIG. 6 illustrates another example system for managing geodemographic data in accordance with aspects of the present invention.

FIG. 6 illustrates another example system 600 for managing geodemographic data in accordance with aspects of the present invention.

As shown in the figure, system 600 includes many components of system 100 of FIG. 1 discussed above. However, system 600 additionally includes a voting component 606. Further, classification component 118 of system 100 is replaced with a classification component 604 in system 600.

In this example, database 106, controlling component 108, accessing component 110, communication component 112, SIG component 114, GLC matrix generation component 116, classification component 604, voting component 606, zonal statistics component 120, FIG component 122 and catalog component 124 are illustrated as individual devices. However, in some embodiments, at least two of database 106, controlling component 108, accessing component 110, communication component 112, SIG component 114, GLC matrix generation component 116, classification component 604, voting component 606, zonal statistics component 120, FIG component 122 and catalog component 124 may be combined as a unitary device. Further, in some embodiments, at least one of database 106, controlling component 108, accessing component 110, communication component 112, SIG component 114, GLC matrix generation component 116, classification component 604, voting component 606, zonal statistics component 120, FIG component 122 and catalog component 124 may be implemented as a computer having tangible computer-readable media for carrying or having computer-executable instructions or data structures stored thereon.

Voting component 606 is arranged to communicate with classification component 604 via a communication channel 608 and to communicate with zonal statistics component 120 via a communication channel 610. Voting component 606 may be any device or system that is able to generate a final surface cover classification based a majority vote of the surface cover classifications generated by classification component 604.

Communication channel 608 and communication channel 610 may be any known wired or wireless communication channel.

System 600 generally functions in a manner similar to system 100 of FIG. 1, with the exception of how the final surface cover classification is determined. In system 600, the pixels are classified based on a voting system of classification component 604 and voting component 606. This will be further described with reference to FIG. 7.

Figure 7:
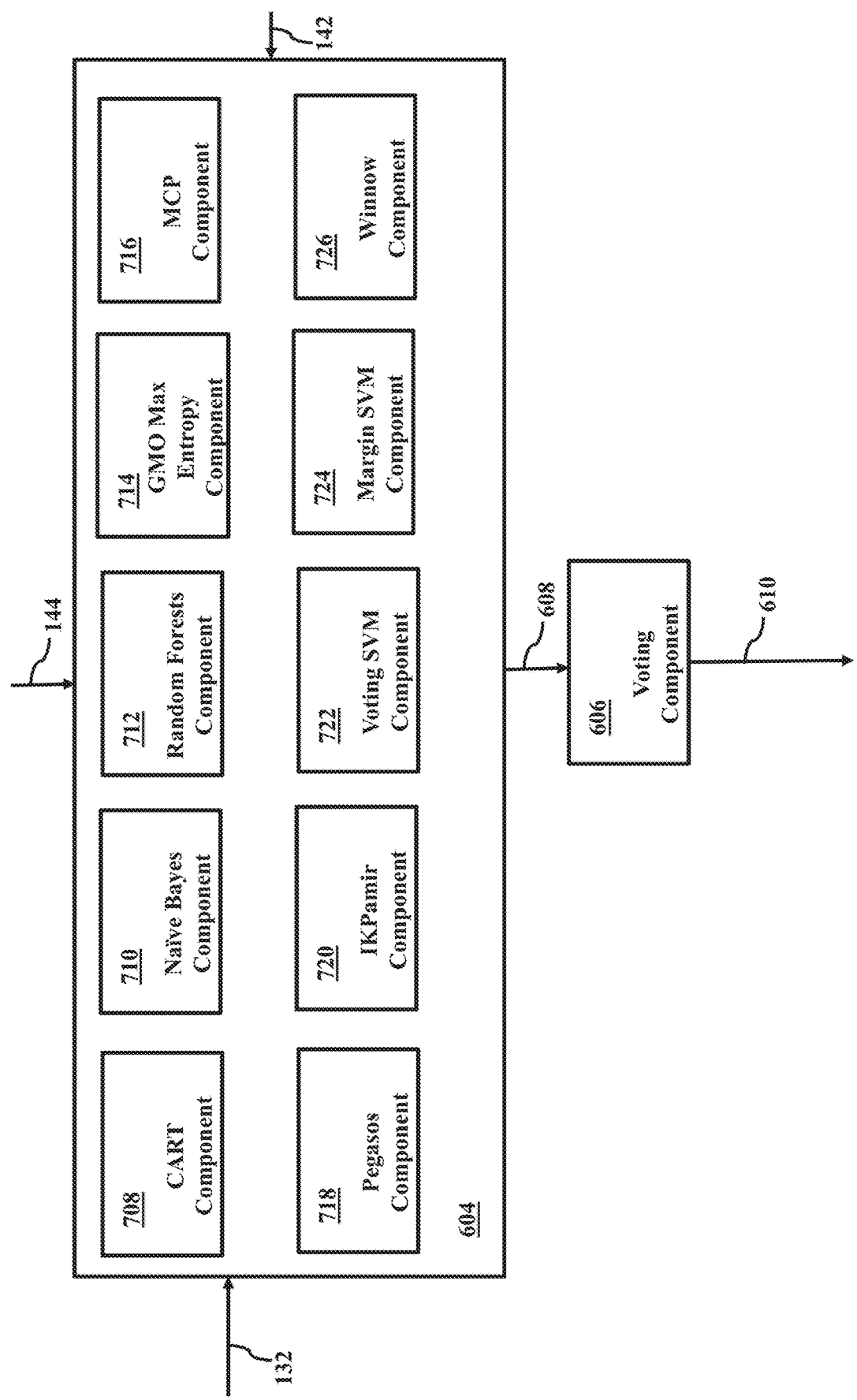
FIG. 7 illustrates the classification component and voting component of the system of FIG. 6.

FIG. 7 illustrates an example of classification component 604 of FIG. 6, in accordance with aspects of the present invention.

As shown in FIG. 7, classification component 604 includes a plurality of classifying components 702 and voting component 606.

Classification component 604 includes a CART classifying component 708, a Naïve Bayes classifying component 710, a random forests classifying component 712, a GMO Max Entropy classifying component 714, an MCP classifying component 716, a Pegasos classifying component 718, an IKPamir classifying component 720, a voting SVM classifying component 722, a margin SVM classifying component 724 and a Winnow classifying component 726. It should be noted, that any number of classifying components may be used in accordance with aspects of the present invention, wherein those listed in classification component 604 are merely non-limiting examples used for purposes of discussion.

In this example, CART classifying component 708, Naïve Bayes classifying component 710, random forests classifying component 712, GMO Max Entropy classifying component 714, MCP classifying component 716, Pegasos classifying component 718, IKPamir classifying component 720, voting SVM classifying component 722, margin SVM classifying component 724 and Winnow classifying component 726 are illustrated as individual devices. However, in some embodiments, at least two of CART classifying component 708, Naïve Bayes classifying component 710, random forests classifying component 712, GMO Max Entropy classifying component 714, MCP classifying component 716, Pegasos classifying component 718, IKPamir classifying component 720, voting SVM classifying component 722, margin SVM classifying component 724 and Winnow classifying component 726 may be combined as a unitary device. Further, in some embodiments, at least one of CART classifying component 708, Naïve Bayes classifying component 710, random forests classifying component 712, GMO Max Entropy classifying component 714, MCP classifying component 716, Pegasos classifying component 718, IKPamir classifying component 720, voting SVM classifying component 722, margin SVM classifying component 724 and Winnow classifying component 726 may be implemented as a computer having tangible computer-readable media for carrying or having computer-executable instructions or data structures stored thereon.

In the example embodiment of FIG. 7, classification component 604 includes 10 distinct classifying components. It should be noted that any number of distinct classifying components equal to or greater than three may be used. The reason that at least three classifying components are used is that the final classification per pixel is based on a majority vote of at least some of the classifying components.

For example, for purposes of discussion, consider classification component 604 of FIG. 7. Further, returning to FIG. 5, let a pixel within image 500 at the location of trees 504, be classified by each of CART classifying component 708, Naïve Bayes classifying component 710, random forests classifying component 712, GMO Max Entropy classifying component 714, MCP classifying component 716, Pegasos classifying component 718, IKPamir classifying component 720, voting SVM classifying component 722, margin SVM classifying component 724 and Winnow classifying component 726. Further, as discussed above, in accordance with aspects of the present invention, each classification is performed with additional reference to the group results generated by GLC matrix component 116 to further reduce the likelihood of an erroneous classification.

Each classifying method may have specific strengths and weaknesses, wherein some instances of classification are more reliable than others. In this example, for purposes of discussion, presume that CART classifying component 708, Naïve Bayes classifying component 710, random forests classifying component 712, GMO Max Entropy classifying component 714 and MCP classifying component 716 correctly classify the pixel within image 500 at the location of trees 504 as corresponding to a tree. Further, presume that Pegasos classifying component 718, IKPamir classifying component 720, and voting SVM classifying component 722 incorrectly classify the pixel within image 500 at the location of trees 504 as corresponding to artificial turf. Finally, presume that margin SVM classifying component 724 and Winnow classifying component 726 incorrectly classify the pixel within image 500 at the location of trees 504 as corresponding to a road.

In this example, clearly there is not 100% agreement between all the classifying components. However, a majority vote of the classifications will increase likelihood of a correct classification.

As shown in FIG. 7, the classifying components provide their respective classifications to voting component 606 via communication channel 608. In some embodiments, the distinct classifications are provided to voting component 606 in a serial manner. In some embodiments, the distinct classifications are provided to voting component 606 in parallel.

Voting component 606 tallies the classifications for the pixels and generates a final classification for the pixels based on a majority vote of the individual classifications. Using the example discussed above, 5 classifying components classify the pixels within image 500 at the location of trees 504 as corresponding to a tree, 3 classifying components classify the pixel within image 500 at the location of trees 504 as corresponding to artificial turf and 2 classifying components classify the pixel within image 500 at the location of trees 504 as corresponding to a road. In this example, the 5 classifying components that classified the pixels within image 500 at the location of trees 504 as corresponding to a tree are a majority as compared to the 3 classifying components that classified the pixels within image 500 at the location of trees 504 as corresponding to artificial turf and as compared to the 2 classifying components that classified the pixels within image 500 at the location of trees 504 as corresponding to a road. Therefore, voting component 606 would generate the final classification of the pixels within image 500 at the location of trees 504 as corresponding to a tree.

In some embodiments, voting component 606 considers the classifications from all classifying components within classification component 604. In other embodiments, voting component 606 may consider the classifications from less than all classifying components within classification component 604, so long as the number of classifications is equal to or greater than three. In this manner, voting component 606 will avoid the situation where two classifying components each provide different classifications for the same image pixels, so there cannot be a majority.

Figure 8:
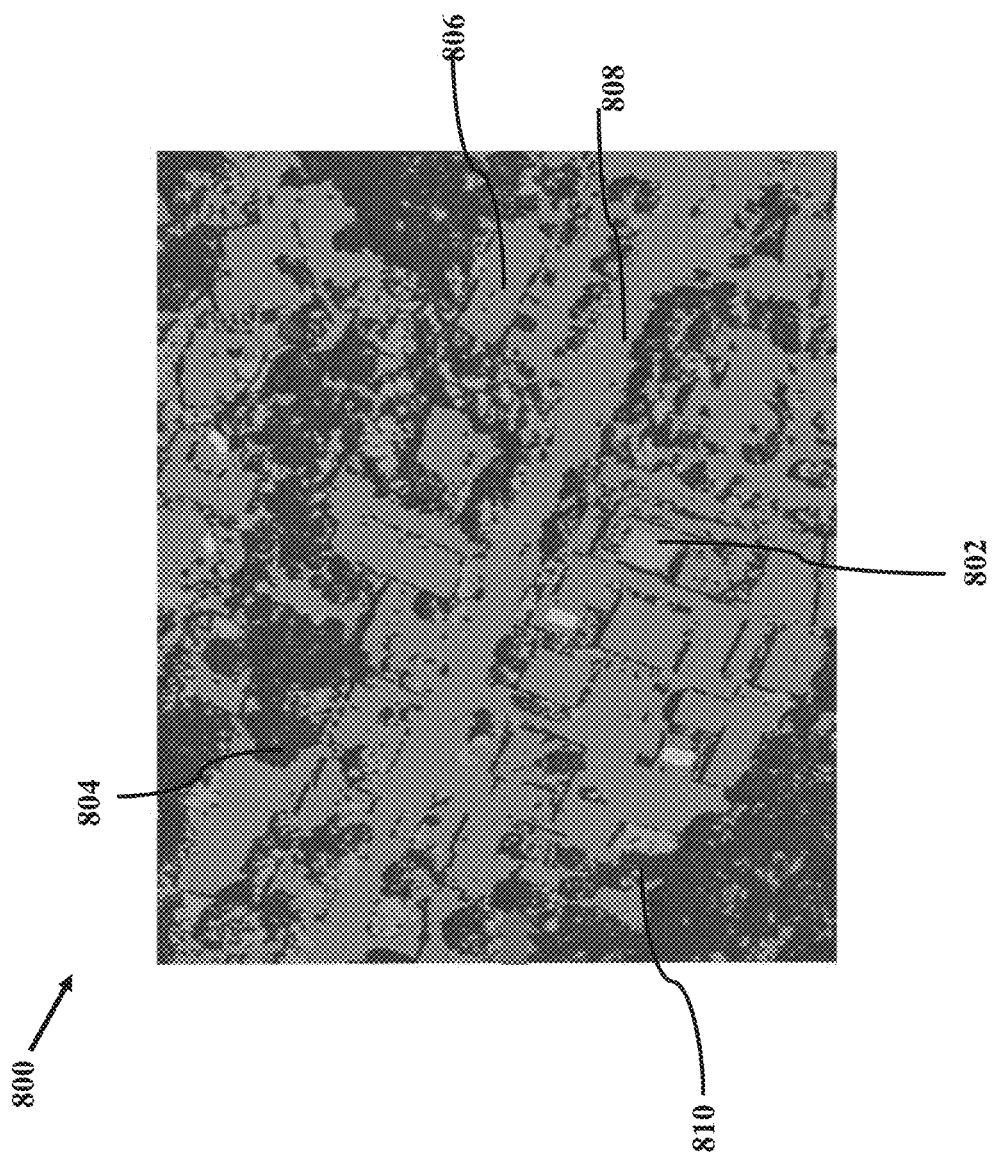
FIG. 8 illustrates a classified image of the plot of land within the satellite image of FIG. 5.

FIG. 8 illustrates a classified image 800 of the plot of land within satellite image 500 of FIG. 5.

As shown in FIG. 8, classified image 800 includes an area 802, an area 804, an area 806, an area 808 and an area 810. Area 802 corresponds to grass 502 of satellite image 500 of FIG. 5. Area 804 corresponds to trees 504 of satellite image 500 of FIG. 5. Area 806 corresponds to building 506 of satellite image 500 of FIG. 5. Area 808 corresponds to road 508 of satellite image 500 of FIG. 5. Area 810 corresponds to man-made pool 510 of satellite image 500 of FIG. 5.

Returning to FIG. 2, after the final classification is generated (S212), segment data is received (S214). For example, as shown in FIG. 1, accessing component 110 provides the segment data to zonal statistics component 120 via communication channel 134. For example, as shown in FIG. 1 accessing component 110 retrieves segment data from database 106. As shown in FIG. 3, database 106 provides the segment data from segment data database 306. As shown in FIG. 4, communication component 402 receives the segment data from segment data database 306 and provides the segment data to segment data receiving component 408 via communication channel 416. Returning to FIG. 1, segment data receiving component 408 (of accessing component 110) then provides the segment data to zonal statistics component 120 via communication channel 134.

At this point, the boundaries of surface are known by way of the segment data. These boundaries may include country boundaries, state boundaries, county boundaries, city/town boundaries and boundaries of individually owned parcels of land. These boundaries may be provided by government entities and/or private entities. Zonal statistics component 120 may use the boundaries as identified in the segment data to establish the surface cover per segment of land.

Returning to FIG. 2, after the segment data is received (S214) and the surface cover has been classified per segment of land, the surface cover by segment is generated (S216). For example, as shown in FIG. 1

Zonal statistics component 120 then generates the surface cover classification per segment of land. For example, if the image data were to include the image of an entire state, zonal statistics component 120 may be able to generate the surface cover classification per county, per town, or even per parcel of land by organizing the surface cover classification per county, per town, etc. More particularly, in some embodiments polygons may be drawn around each land cover type. The end result is a vector layer of land cover polygons that are then used to calculate area. Zonal statistics is not often used, but is used in more general remote sensing applications. The biggest difference is that zonal statistics are derived directly from the imagery. On the other hand, surface cover calculation using vector layers has an intermediary step of transforming the image into a vector layer for each surface cover type, and then the area for each vector layer is calculated within the parcel.

Returning to FIG. 2, after the surface cover by parcel is generated (S216), the feature data is received (S218). For example, as shown in FIG. 1, accessing component 110 provides the feature data to FIG component 122 via communication channel 136. For example, as shown in FIG. 1 accessing component 110 retrieves feature data from database 106. As shown in FIG. 3, database 106 provides the feature data from feature data database 308. As shown in FIG. 4, communication component 402 receives the feature data from feature data database 308 and provides the feature data to feature data receiving component 410 via communication channel 418. Returning to FIG. 1, feature data receiving component 410 (of accessing component 110) then provides the feature data to FIG component 122 via communication channel 136.

Feature data may be any data associated with a geographic region, non-limiting examples of which include demographics, climate, weather, marketing, land cover attributes and correlations between them. In one non-limiting example, feature data may include population data within the geographic region broken down into age categories. In another non-limiting example, feature data may include population data within the geographic region broken down into income categories. In another non-limiting example, feature data may include a number of in-ground pools within the geographic region. In another non-limiting example, feature data may include the number of houses within the geographic region that have a paved driveway. In another non-limiting example, feature data may include the number of houses within the geographic region that have an in-ground pool and a paved driveway.

Returning to FIG. 2, after the feature data is received (S218), the feature index is generated (S220). For example, as shown in FIG. 1 accessing component 110 retrieves training data from database 106. As shown in FIG. 3, database 106 provides the feature data from feature data database 308. As shown in FIG. 4, communication component 402 receives the feature data from feature data database 308 and provides the feature data to feature data receiving component 410 via communication channel 418. Returning to FIG. 1, feature data receiving component 410 (of accessing component 110) then provides the feature data to FIG component 122 via communication channel 136. FIG component 122 determines a feature index based on the feature data.

Figure 9:
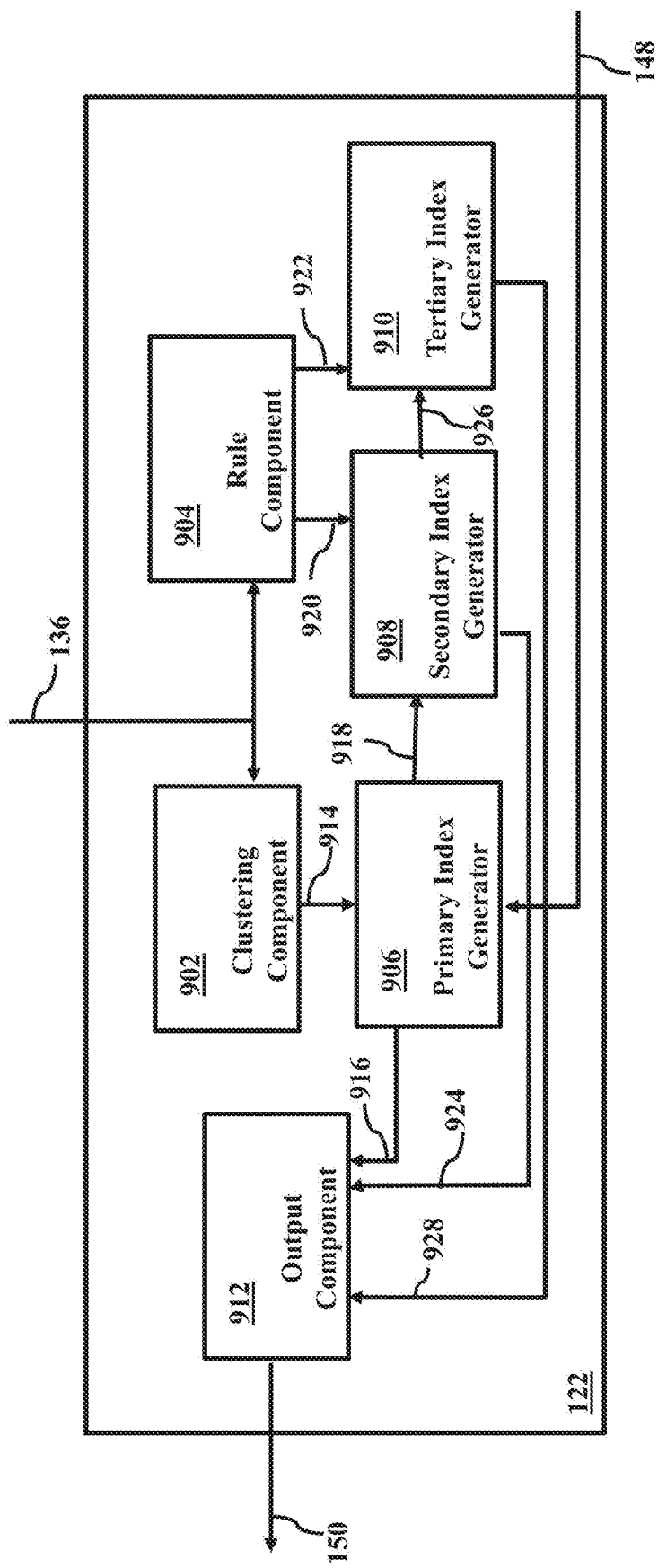
FIG. 9 illustrates the catalog component of the system of FIG. 1.

FIG. 9 illustrates an example FIG component 122 in accordance with aspects of the present invention.

As shown in the figure, FIG component 122 includes a clustering component 902, a rule component 904, a primary index generator 906, a secondary index generator 908, a tertiary index generator 910 and an output component 912.

In this example, rule component 904, primary index generator 906, secondary index generator 908, tertiary index generator 910 and output component 912 are illustrated as individual devices. However, in some embodiments, at least two of rule component 904, primary index generator 906, secondary index generator 908, tertiary index generator 910 and output component 912 may be combined as a unitary device. Further, in some embodiments, at least one of rule component 904, primary index generator 906, secondary index generator 908, tertiary index generator 910 and output component 912 may be implemented as a computer having tangible computer-readable media for carrying or having computer-executable instructions or data structures stored thereon.

Clustering component 902 is arranged to communicate with accessing component 110 via communication channel 136 and is arranged to communicate with primary index generator 906 via a communication channel 914. Clustering component 902 may be any device or system that is able to tally feature data within the geographical region.

Primary index generator 906 is additionally arranged to communicate with output component 912 via a communication channel 916, to communicate with secondary index generator 908 via a communication channel 918 and to communicate with zonal statistics component 120 (not shown) via communication channel 148. Primary index generator 906 may be any device or system that is able to generate a primary index based on the tallied feature data and the zonal statistics data.

Rule component 904 is arranged to communicate with accessing component 110 via communication channel 136, is arranged to communicate with secondary index generator 908 via a communication channel 920 and is arranged to communicate with tertiary index generator 910 via a communication channel 926. Rule component 904 may be any device or system that is able to create, or have stored therein, rules for associating the feature data.

Secondary index generator 908 is additionally arranged to communicate with output component 912 via a communication channel 924, to communicate with tertiary index generator 910 via a communication channel 926 and to communicate with zonal statistics component 120 (not shown) via communication channel 148. Secondary index generator 908 may be any device or system that is able to generate a secondary index based on predetermined Boolean associations of the primary index.

Tertiary index generator 910 is additionally arranged to communicate with output component 912 via a communication channel 928 and to communicate with zonal statistics component 120 (not shown) via communication channel 148. Tertiary index generator 910 may be any device or system that is able to generate a tertiary index based on a predetermined threshold of a second set of Boolean associations of the feature index.

Output component is additionally arranged to communicate with zonal statistics component 120 (not shown) via communication channel 148 and to communicate with catalog component 124 via communication channel 150.

Communication channels 914, 916, 918, 920, 922, 924, 926 and 928 may be any known wired or wireless communication channel.

In operation, clustering component 902 and rule component 904 receive feature data from accessing component 110 via communication channel 136.

Clustering component 906 clusters portions of the feature data based on predetermined features. In example embodiment, clustering component 906 tallies discrete data entries within the geographical area of the image data. Such tallies may be associated with any component within the feature data. For example, data supplied by a census database may provide tallies of population by age, race, income, etc., whereas data supplied by a local zoning board may provide tallies of parcels of land classified as residential, commercial or industrial and whereas weather data supplied by weather station my provide tallies on the number of days of rain, snow or sunshine. Clustering component 906 provides the raw tallies to primary index generator 906 via communication channel 914.

Primary index generator 906 generates a primary feature index based on the raw tallies of the feature data from clustering component 902 and the segment land cover classification from zonal statistics component 120.

In particular, zonal statistics component 120 provides zonal statistics within a segment of land cover. For example, zonal statistics component 120 provides the segment land cover classification so as to indicate e.g., number of houses per parcel within the geographic area, the area of paved streets within the geographic area and number of paved driveways per parcel within the geographic area, etc. As discussed above, this segment land cover classification is generated from supplied zonal statistics data that is fused with surface area classification data that is derived from image data of the geographic area, as shown for example with reference to FIG. 8.

Primary index generator 906 then fuses the segment land cover classification with the raw tallies of the feature data. For example, for purpose of discussion, let examples of raw tallies of the feature data include a total number of households within a geographic area, a total population within a geographic area, and the average daily rainfall within the geographic area. In such an example, primary index generator 906 may generates a primary feature index so as to indicate e.g., the average number of persons (based on the given number of houses) per parcel within the geographic area, the average amount of evaporated water (based on the area of paved streets and the number of paved driveways) within the geographic area, etc. In this manner, the generated primary index is strictly based on the raw tallies of the feature data per segment of land within the geographic area.

Primary index generator 906 outputs the generated primary feature index to output component 912 via communication channel 916 and to secondary index generator 908 via communication channel 918.

Secondary index generator 908 generates a secondary feature index based on the primary feature index from primary index generator 906, the primary rules provided by rule component 904.

In particular, rule component 904 has primary rules for associating the feature data as provided by accessing component 110. Non-limiting examples of such primary rules include Boolean operations of types of feature data. For example, suppose data supplied by a census database may provide tallies of population by age, race, income, etc., whereas data supplied by a local zoning board may provide tallies of parcels of land classified as residential, commercial or industrial and whereas weather data supplied by weather station my provide tallies on the number of days of rain, snow or sunshine. Non-limiting example primary rules may include; houses AND population density greater than a predetermined population density threshold; houses NOT with an average income lower than $50,000 per year, etc.

As discussed above zonal statistics component 120 has provided zonal statistics within a segment of land cover by way of the primary index from primary index generator 906. Again, suppose for example that zonal statistics component 120 provides the segment land cover classification so as to indicate e.g., number of houses per parcel within the geographic area, the area of paved streets within the geographic area and number of paved driveways per parcel within the geographic area, etc.

Secondary index generator 908 then tallies predetermined Boolean operations of the primary index. In other words, secondary index generator 908 ultimately fuses the segment land cover classification with the feature data that has been associated by the primary rules of rule component 904. For example, for purpose of discussion, let examples associated feature data as associated by the primary rules of rule component 904 include a total number of households within a geographic area that have an average income greater than $200,000 per year. In such an example, secondary index generator 908 may generates a secondary feature index so as to indicate e.g., the average number of households (based on the given number of persons) per parcel within the geographic area, etc. In this manner, the generated secondary index is based on predetermined Boolean associations the feature data per segment of land within the geographic area.

Secondary index generator 908 outputs the generated secondary feature index to output component 912 via communication channel 924 and to tertiary index generator 910 via communication channel 926.

Tertiary index generator 910 generates a tertiary feature index based on the secondary feature index from secondary index generator 908 and the secondary rules provided by rule component 904. In short, tertiary index generator 910 may be considered an inference engine, in that inferences are determined based on predetermined thresholds of calculated likelihoods of the predetermined Boolean operations.

In particular, rule component 904 has secondary rules for associating the feature data as provided by accessing component 110. Non-limiting examples of such secondary rules include predetermined statistical thresholds of Boolean operations of types of feature data. For example, suppose data supplied by a census database may provide tallies of population by age, race, income, etc., whereas data supplied by a local zoning board may provide tallies of parcels of land classified as residential, commercial or industrial and whereas weather data supplied by weather station my provide tallies on the number of days of rain, snow or sunshine. Non-limiting example secondary rules may include; an Boolean association of types of feature data that is greater than 60%. After all predetermined possible Boolean relationships are determined, those that have an association that is greater than 60% will be included. Such an example relationship may include population density of greater than 8 per acre AND houses with an average income lower than $50,000 per year AND annual death rates of 15% within the geographic area, etc.

As discussed above zonal statistics component 120 provides zonal statistics within a segment of land cover. Again, suppose for example that zonal statistics component 120 provides the segment land cover classification so as to indicate e.g., number of houses per parcel within the geographic area, the area of paved streets within the geographic area and number of paved driveways per parcel within the geographic area, etc.

Tertiary index generator 910 then tallies Boolean operations of the primary index that provide a likelihood greater than a predetermined threshold. In other words, tertiary index generator 910 ultimately the segment land cover classification with the feature data that has been associated by the secondary rules of rule component 904. For example, for purpose of discussion, let examples associated feature data as associated by the secondary rules of rule component 904 include population density of greater than 8 per acre AND houses with an average income lower than $50,000 per year AND annual death rates of 15% within the geographic area. In such an example, tertiary index generator 910 may generate a tertiary feature index so as to indicate e.g., the average number of high population and low-income households that live relatively long lifespans per parcel within the geographic area, etc. In this manner, the generated tertiary index is based on a predetermined likelihood of Boolean associations the feature data per segment of land within the geographic area.

Tertiary index generator 910 outputs the generated tertiary feature index to output component 912 via communication channel 928.

At this point, output component has received the primary feature index from primary index generator 906, the secondary feature index from secondary index generator 908 and the tertiary feature index from tertiary index generator 910. The primary feature index relates to the raw tallies of features from the feature data per land segment, which will illustrate measured features per land segment. The secondary feature index relates to predetermined Boolean relationships of features from the feature data per land segment, which will illustrate predetermined associations of measured features per land segment. The tertiary feature index relates to predetermined likelihoods of Boolean relationships of features from the feature data per land segment, which will infer associations of measured features per land segment.

For example, for purposes of discussion, let the plot of land within image 500 of FIG. 5 be a delineated parcel of land.

At this point of method 200, surface cover of the parcel of land within image 500 has been determined. As shown in FIG. 1, zonal statistics component 120 provides the surface cover of the parcel of land to FIG component 122 via communication channel 148. Further, the feature data is known from feature data database 308. As such, the features of the plot of land within image 500 of FIG. 5 have determined.

Features per segment of land may then be determined.

Returning to FIG. 2, after the feature index is generated (S220), a catalog is generated (S222). For example, as shown to FIG. 1, FIG component 122 outputs the feature index to catalog component 124 via communication channel 150. In some embodiments, catalog component 124 may output the primary feature index as a catalog. In some embodiments, catalog component 124 may output the secondary feature index as a catalog. In some embodiments, catalog component 124 may output the tertiary feature index as a catalog. In some embodiments, catalog component 124 may output a combination of at least two of the primary feature index, the secondary feature index and the tertiary feature index as a catalog.

Catalog component 124 generates a catalog based on outputs the segment feature index. The catalog is a taxonomy of the data provided by FIG component 122. For example, from the primary feature index, the catalog may include strict tallies of classifications of types of data per land segment, e.g., number of homes, number of pools, square feet of paved roads, square feet of grass, square feet of tree cover, etc. Further, for example, from the secondary feature index, the catalog may include tallies of predetermined associations of data per land segment, e.g., number of homes AND pools, lots greater than 1 acre AND an annual income greater than $200,000, etc. Still further, for example, from the tertiary feature index, the catalog may include tallies of associations of data per land segment that have a statistical likelihood of greater than a predetermined threshold, e.g., lots greater than 1 acre AND an a house having a roof area greater than 1200 square feet and annual income greater than $150,000 are 75% likely to purchase solar panels, etc.

Catalog component 124 outputs the catalog to communication component 112. Communication component 112 may then provide the catalog to network 104. From network 104, the catalog associated with a geographic area may be accessible.

Returning to FIG. 2, after catalog is generated (S222), method 200 stops (S224).

It should be noted that in the non-limiting example embodiments discussed above with reference to FIGS. 1 and 6, surface cover classifications are generated and provided to zonal statistics component 120. However, in other embodiments, such surface cover classifications may be provided by any known manner, including a direct import from a database. The novel features of the invention, including determining such surface cover classifications per land segment and fusing such surface cover classifications per land segment with feature data to generate a catalog, may then be used in conjunction with the provided surface cover classifications.

In accordance with aspects of the present invention, a system and method for managing geodemographic data uses a plurality of classifying components to classify the image data. A majority voting mechanism increases the likelihood for accuracy of classification of the image data. Further, in accordance with aspects of the present invention, a zonal statistics component provides classification of the image data per segment of land within the image data. Still further, feature data is used to generate a feature index. This feature index is then used with the classification of the image data per segment of land to determine specific features within per segment of land.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A computer-implemented method for image analysis by one or more computer executing executable instructions stored in one or more non-transitory, tangible, computer readable media, the method comprising:
   receiving one or more multiband image of a geographic region, the one or more multiband image having pixels;
   generating a grey level co-occurrence matrix for the pixels in the one or more multiband image;
   generating a surface index for the one or more multiband image containing information indicative of a surface type represented by one or more of the pixels in the one or more multiband image;
   classifying the pixels of the one or more multiband image into one of a group of predefined land cover classes, based on the surface index in combination with the grey level co-occurrence matrix;
   receiving information indicative of features within a first multiband image of the one or more multiband image;
   dividing the first multiband image into segments; and
   creating a segment feature index of the features for each segment, wherein the segment feature index comprises a primary feature index, a secondary feature index, and a tertiary feature index.

2. The computer-implemented method of claim 1, wherein generating the surface index includes generating a vegetation index for the multiband image containing information indicative of whether one or more of the pixels in the one or more multiband image represents vegetation.

3. The computer-implemented method of claim 1, wherein classifying pixels in the one or more multiband image into one of a group of predefined land cover classes, based on the surface index in combination with the grey level co-occurrence matrix, further comprises classifying pixels in the one or more multiband image into one of the group of predefined land cover classes, based on the surface index in combination with the grey level co-occurrence matrix and based on a majority vote of results of a plurality of classification algorithms determining a plurality of surface cover classifications of the pixels.

4. The computer-implemented method of claim 3, wherein the plurality of classification algorithms include three or more of a CART classification, a Naïve Bayes classification, a random forests classification, a GMO Max Entropy classification, an MCP classification, a Pegasos classification, an IKPamir classification, a voting SVM classification, a margin SVM classification, and a Winnow classification.

5. The computer-implemented method of claim 1, further comprising:
dividing the pixels of a first multiband image of the one or more multiband image into two or more segments of the first multiband image; and
generating a land cover classification for each of the two or more segments of the first multiband image based on the classification of the pixels.

6. The computer-implemented method of claim 1, further comprising:
dividing the pixels of a first multiband image of the one or more multiband image into a first class image and a second class image, wherein classifying the pixels of the first multiband image comprises classifying pixels of the first class image and classifying pixels of the second class image; and
reassembling the first multiband image from the first class image and the second class image.

7. The computer-implemented method of claim 1, wherein the primary feature index includes a number of measured features per segment;
wherein the secondary feature index includes predetermined Boolean relationships of features of each segment; and
wherein the tertiary feature index includes predetermined likelihoods of Boolean relationships of features of each segment and a predetermined threshold of the predetermined likelihoods.

8. The computer-implemented method of claim 7, wherein the information indicative of features includes one or more of land cover attributes information, demographic information, man-made structure information, and weather information.

9. The computer-implemented method of claim 1, further comprising:
generating land cover classifications for one or more geographic area based on the classification of the pixels in a first multiband image and a second multiband image of the one or more multiband image.

10. A non-transitory, tangible, computer-readable media having computer-readable instructions stored thereon, for use with a computer and being capable of instructing the computer to perform a method comprising:
receiving one or more multiband image of a geographic region, the one or more multiband image having pixels;
generating a grey level co-occurrence matrix for the pixels in the one or more multiband image;
generating a surface index for the one or more multiband image containing information indicative of a surface type represented by one or more of the pixels in the one or more multiband image;
classifying the pixels of the one or more multiband image into one of a group of predefined land cover classes, based on the surface index in combination with the grey level co-occurrence matrix;
receiving information indicative of features within a first multiband image of the one or more multiband image;
dividing the first multiband image into segments; and
creating a segment feature index of the features for each segment, wherein the segment feature index comprises a primary feature index, a secondary feature index, and a tertiary feature index.

11. The non-transitory, tangible, computer-readable media of claim 10, wherein generating the surface index includes generating a vegetation index for the multiband image containing information indicative of whether one or more of the pixels in the one or more multiband image represents vegetation.

12. The non-transitory, tangible, computer-readable media of claim 10, wherein classifying pixels in the one or more multiband image into one of a group of predefined land cover classes, based on the surface index in combination with the grey level co-occurrence matrix, further comprises classifying pixels in the one or more multiband image into one of the group of predefined land cover classes, based on the surface index in combination with the grey level co-occurrence matrix and based on a majority vote of results of a plurality of classification algorithms determining a plurality of surface cover classifications of the pixels.

13. The non-transitory, tangible, computer-readable media of claim 12, wherein the plurality of classification algorithms include three or more of a CART classification, a Naïve Bayes classification, a random forests classification, a GMO Max Entropy classification, an MCP classification, a Pegasos classification, an IKPamir classification, a voting SVM classification, a margin SVM classification, and a Winnow classification.

14. The non-transitory, tangible, computer-readable media of claim 10, further comprising:
dividing the pixels of a first multiband image of the one or more multiband image into two or more segments of the first multiband image; and
generating a land cover classification for each of the two or more segments of the first multiband image based on the classification of the pixels.

15. The non-transitory, tangible, computer-readable media of claim 10, further comprising:
dividing the pixels of a first multiband image of the one or more multiband image into a first class image and a second class image, wherein classifying the pixels of the first multiband image comprises classifying pixels of the first class image and classifying pixels of the second class image; and
reassembling the first multiband image from the first class image and the second class image.

16. The non-transitory, tangible, computer-readable media of claim 10:
wherein the primary feature index includes a number of measured features per segment;
wherein the secondary feature index includes predetermined Boolean relationships of features of each segment; and
wherein the tertiary feature index includes predetermined likelihoods of Boolean relationships of features of each segment and a predetermined threshold of the predetermined likelihoods.

17. The non-transitory, tangible, computer-readable media of claim 16, wherein the information indicative of features includes one or more of land cover attributes information, demographic information, man-made structure information, and weather information.

18. The non-transitory, tangible, computer-readable media of claim 10, further comprising:
generating land cover classifications for one or more geographic area based on the classification of the pixels in a first multiband image and a second multiband image of the one or more multiband image.

* * * * *